United States Patent
Helbling et al.

(10) Patent No.: US 6,825,252 B2
(45) Date of Patent: Nov. 30, 2004

(54) USE OF STARCH DISPERSIONS AS BINDER IN COATING COMPOSITIONS AND PROCESS FOR PREPARING THE STARCH DISPERSIONS

(75) Inventors: André Marcel Helbling, Waedenswil (CH); Michael Robert Hills, Midland, MI (US); Friederike Theresia Stollmaier, Rheinmunster (DE); Thomas Martin Stephan Annen, Steinen (CH)

(73) Assignee: Ecosynthetix Inc., Lansing, MI (US)

( * ) Notice: Subject to any disclaimer, the term of this patent is extended or adjusted under 35 U.S.C. 154(b) by 0 days.

(21) Appl. No.: 10/333,857

(22) PCT Filed: Jul. 24, 2001

(86) PCT No.: PCT/NL01/00571

§ 371 (c)(1),
(2), (4) Date: Jul. 23, 2003

(87) PCT Pub. No.: WO02/08517

PCT Pub. Date: Jan. 31, 2002

(65) Prior Publication Data

US 2004/0014844 A1 Jan. 22, 2004

(30) Foreign Application Priority Data

Jul. 24, 2000 (EP) ............................................. 00115871

(51) Int. Cl.$^7$ .................................................. C08L 3/04
(52) U.S. Cl. .................... 524/47; 106/206.1; 106/501.1; 536/106
(58) Field of Search ......................... 524/47; 106/206.1, 106/501.1; 536/106

(56) References Cited

U.S. PATENT DOCUMENTS 3,876,629 A  4/1975  Lotzgesell .................. 536/106
5,512,617 A  4/1996  Ritter et al. .................. 524/47

FOREIGN PATENT DOCUMENTS

| GB | 1412422 | 11/1975 |
| JP | 51-0751104 | * 6/1976 |
| WO | 88 08757 | 11/1988 |

* cited by examiner

*Primary Examiner*—Peter Szekely
(74) *Attorney, Agent, or Firm*—Young & Thompson

(57) ABSTRACT

Coating compositions comprising a pigment and starch dispersion of discrete crosslinked starch particles in an aqueous liquid. The dispersion may be used as coating color for paper. A preferred process of preparing the dispersion of starch particles comprises (a) obtaining a mixture of starch and an aqueous liquid; (b) processing the mixture using shear forces in the presence of a crosslinker in an extruder; and (c) injecting a hydroxylic liquid into the extruder and dispersing the mixture inside the extruder or outside the extruder or both inside and outside the extruder to obtain the dispersion.

16 Claims, No Drawings

USE OF STARCH DISPERSIONS AS BINDER IN COATING COMPOSITIONS AND PROCESS FOR PREPARING THE STARCH DISPERSIONS

The present invention relates to pigmented coating compositions comprising starch dispersions as binders, to a novel process for their preparation and to the dispersions obtainable by that process.

Paper is composed of individual fibers and has thus a rough surface and pores whose size corresponds approximately to the fiber dimensions. Since the roughness has a negative effect on printing, most paper and board is coated to impart a smooth surface for printing. Coating of paper is a process by which a mixture of water, white pigments, binder and optionally various additives are applied to one or both sides of a paper sheet. Those pigmented paper coating compositions are also known as coating colors. The resulting covering and smoothening of the surface of the paper improves its glaze, gloss, brightness and above all, its printability in all conventional printing processes.

The properties of the coating colors must be adapted to the coating process and the intended use of the coated paper. The solids content greatly influences the runnability of the coating colors in the coating machine. It basically influences the viscosity of the color and its flow behavior at varying shear stress in the coating machine. The various components of the coating color determine the solids content attainable at a given viscosity. The highest possible solids content is aimed for to save drying energy. For most coating processes the water retention capacity of the coating color is also important; i.e. the ability of the coating color to retain water in spite of the sucking action of the coating base paper. If the water retention capacity of a coating color is too low, it may be too strongly dewatered between application and leveling.

Apart form water. the main components of a coating color are pigments and binders. The function of the binder is to bind the pigment particles to each other and to fix the coat to the base paper. Binders have a large influence on the coating and processing properties of the coating color. Binders are derived from natural raw materials or are prepared fully synthetically. In general, natural binders are used as additives for synthetic polymer binders. Solutions of starch derivatives are a common binder of natural origin. Moreover, the sodium salt of carboxymethyl cellulose (CMC) is the principal cellulose ether used as a naturally derived semi-synthetic co-binder in paper coating.

Whereas in the initial days of paper coating natural binders were used exclusively, in the 1940s the demand for synthetic binders in the form of polymer dispersions (latices) started increasing. These products made it possible for the first time to attain a high solids content at low viscosities, a prerequisite for modern high-speed coating machines. Styrene-butadiene dispersions are the most widely used latices worldwide. Acrylate dispersions are of comparable importance in Europe. These latices are usually mixed with co-binders, such as starch or CMC. A major disadvantage of synthetic and semisynthetic binders is their higher price in comparison to natural binders such as starch.

It was found by the present inventors that starch dispersions can be used as the binder in a pigmented coating composition. The coating composition of the present invention comprises a pigment and a starch dispersion of discrete crosslinked starch particles in an aqueous liquid.

Using the starch dispersions as a binder. storage stable coating compositions can be prepared at relatively high solids contents without significantly high viscosities. The pigmented coating compositions are preferably used as coating colors (pigmented paper coating) to coat paper and cardboard. But they can also be applied to other substrates such as for example plastic films. The pigmented coatings are preferably used to improve paper properties as a precoat or as a topcoat.

Preferably, the starch dispersions are used in the pigmented paper coating compositions as co-binders in combinations with synthetic binders, i.e. polymer latices such as styrene-butadiene dispersions and acrylate dispersions. However, due to the low viscosity of the coating compositions comprising the starch dispersions they may also be used as the sole binder. When the coating composition comprises the starch dispersion as the only binder it is often desirable to use the starch in higher amounts than a synthetic latex in order to obtain the same binding strength.

The pigmented coating compositions comprise the starches preferably in levels from 1 to 300 parts by weight of dry starch based on 100 parts by weight of pigments depending on the specific starch dispersion employed, the desired properties and whether the starch is used as co-binder or the sole binder. If the starch functions as a co-binder it is preferably used in amounts of from 1 to 10 parts by weight in combination with a binder, e.g. a latex, which is used in amounts of from 1 to 20 parts by weight; if the starch is the sole binder it is preferably used in amounts of from 8 to 300 parts by weight, all parts based on 100 parts of pigment.

Preferred pigments are clay, calcium carbonate, calcium sulfoaluminate (satin white), talc, titanium dioxide, barium sulfate, silica or plastic pigments based on polymer particles with a high glass transition temperature like polystyrene.

The pigmented coating composition may contain additional ingredients usually comprised in coating colors. Examples for such additives are foam control agents, optical brightening agents, rheology additives, wetting agents, crosslinking agents, surfactants, lubricants, dispersing agents and dyes.

The advantages of using the starch dispersions according to the present invention as binders in pigmented coating compositions are that higher amounts of starch can be used compared to conventional solutions of starch derivatives and that high solids formulations can be prepared without excessive viscosities and without viscosity instabilities as observed when conventional starch solutions are used in high amounts. The solids content of the pigmented coating compositions preferably ranges from 50 to 74% by weight, more preferably from 55 to 74% by weight and most preferably from 60 to 74% by weight. The pigmented coating compositions simultaneously show superior water retention capacity avoiding runnability deficiencies during coating. Properties of the paper coated with the pigmented coating compositions such as e.g. paper gloss, ink gloss, dry pick resistance, ink piling, ink set off, mottling and brightness are at least as good as with standard coatings if not better. The use of starch as co-binder or sole binder also means a cost advantage versus the use of synthetic binders and co-binders.

Starch can be formed into a dispersion by processing the starch using shear forces and simultaneously crosslinking. A mixture of starch and an aqueous liquid, preferably selected from water and a combination of water and alcohol is processed using shear forces, preferably in an extruder, in the presence of a crosslinker. A hydroxylic liquid, preferably selected from water, alcohol and a mixture of water and alcohol is then added to the mixture and the mixture is dispersed to obtain a dispersion of starch particles.

The starch is preferably native starch, but previously modified starch derivatives may be used as well. Preferred sources of native starch are corn, wheat, rice, potato, tapioca, and barley. The starch can be waxy starch. Starch derivatives which can be used are e.g. cationic and anionic starches, carboxylated starches, carboxy methylated starches, sulfated starches, phosphated starches, starch ethers like hydroxy alkylated starches, e.g. hydroxy ethylated and hydroxy propylated starches, oxidized starches containing carboxy or dialdehyde groups or hydrophobized starches like acetate esters, succinate ester, half-esters or phosphate esters and the like. In the process of preparing the starch dispersion starch granules or pregelatinized starch can be used as preferred starting material. Mixtures of starch with other biopolymers containing at least 50% by weight of starch can also be used as starting material. Suitable biopolymers are exemplified by other polysaccharides such as cellulose and gums. as well as proteins (e.g. gelatin, whey protein).

The starting material is mixed with an aqueous liquid selected from water or a combination from water and an alcohol such as ethanol. A mixture of starch and aqueous liquid also encompasses pregelatinized starch as the starting material which might be fed to the extruder without additional liquid. The mixture preferably has a solids content of at least 50% by weight, especially at least 60% by weight at the time when processing starts.

The processing using shear forces is preferably performed at elevated temperatures above room temperature and below the degradation point of the starch and additional biopolymer, if used. The temperature ranges from preferably 30° C., more preferably 40° C., and most preferably 60° C., to preferably 200° C. more preferably 140° C. The shear can be effected by applying at least 100 J of specific mechanical energy (SME) per g of starch. Depending on the processing apparatus used the necessary energy may be higher; also when non-pregelatinized material is used. the necessary SME may be higher. preferably at least 250 J/g, more preferably at least 500 J/g. High pressure (e.g. between 5 and 150 bar) may be applied to facilitate processing at high concentrations.

A plasticizer may be present in addition to the water or water/alcohol mixture, such as a polyol (e.g. ethylene glycol, propylene glycol, polyglycols, glycerol, sucrose, maltose, maltodextrines, and sugar alcohols such as sorbitol), urea, sodium lactate, amino acids, or citric acid esters at a level of from 5 to 40% by weight based on the dry weight of the starch or mixture of starch and other biopolymer, if used. However, water can already act as a plasticizer. The total amount of plasticizers (i.e. water and additional plasticizer) preferably ranges from 5 and 50% by weight based on the dry weight of the starch or mixture of starch and other biopolymer, if used. A lubricant, such as lecithin, other phospholipids or monoglycerids, may also be present, preferably at a level of 0.5 to 2.5% by weight based on the dry weight of the starch or mixture of starch and other biopolymer, if used. An acid modifier, preferably a solid or semi-solid organic acid, such as maleic acid, maleic anhydride, citric acid, oxalic acid, lactic acid, gluconic acid, or a carbohydrate-degrading enzyme, such as amylase, may be present at a level of 0.01 to 5% by weight based on the weight of the starch or mixture of starch and other biopolymer; the acid modifier or enzyme assists in slight depolymerization which is assumed to be advantageous in the process of producing starch dispersions comprising particles of a specific size.

An essential step in the process of forming the starch dispersion is the crosslinking. Usually heat and shear treatment of native starches without simultaneously crosslinking leads to starch pastes which are much more viscous at solids contents of higher than 5% and room temperature. For reaching solids contents in the range of 20% at manageable viscosities at room temperature highly modified starches like acid modified starches. oxidized starches and derivatives like hydroxyethyl esters or acetate esters are needed and for example subjected to jet cooking. These high solids slurries are however not storage stable at room temperature and need to be stored at high temperatures in the range of 70 to 90° C.

Suitable crosslinkers for preparing the starch dispersions are dialdehydes and polyaldehydes, which reversibly form hemiacetals, acid anhydrides and mixed anhydrides (e.g. succinic and acetic anhydride) and the like. Suitable dialdehydes and polyaldehydes are glutaraldehyde, glyoxal, periodate-oxidized carbohydrates, and the like. Other crosslinkers are for example epichlorohydrin and other epoxides, triphosphates, divinyl sulphone. The crosslinking agent can be a reversible or non-reversible crosslinker. The level of crosslinker varies depending on the strength of the crosslinks it forms with starch. Such crosslinkers may be used alone or as a mixture. The crosslinking reaction may be acid- or base-catalyzed. The level of crosslinking agent preferably ranges from 0.01 to 7% by weight, based on the dry weight of the starch or mixture of starch and other biopolymer, if used. The crosslinking agent is either already present at the start of the shearing process or added during the shearing process. Addition of the crosslinking agent during processing is preferred when the starting material is granular starch.

After crosslinking. dispersion of the mixture in a suitable liquid follows. usually water and/or another hydroxylic liquid such as an alcohol, preferably to a concentration of from 20 to 50% by weight, more preferably from 25 to 50% by weight, and most preferably from 30 to 50% by weight. The final dispersing step is preferably conducted at ambient temperature.

The resulting starch dispersions are low in viscosity, viscosity-stable at ambient temperature and colloidally stable. It is preferred that the viscosities of starch dispersions having a solids content of at least 25% by weight is less than 4,000 mPa·s, more preferably less than 3,000 mPa·s and most preferably less than 2,500 mPa·s, measured at 23° C. using a Brookfield RVT viscosimeter at a spindle speed of 20 rpm. The starch dispersions are preferably viscosity-stable for at least two months.

Stable starch dispersions can even be prepared from native starches by processing the starch using shear forces and simultaneously crosslinking as described above. Of course, modified starches may also be used, if desired.

If desired, the dispersed starch may be further crosslinked, using the same or other crosslinking agents as describe above.

A cryogenic grinding step may be performed prior to the dispersion step. However, the starch dispersion for use in pigmented coating compositions can also be prepared by a process wherein the liquid to disperse the starch particles is injected directly into the extruder without a cryogenic grinding step. This novel method of preparing a dispersion of starch particles in an aqueous liquid comprises:
(a) obtaining a mixture of starch and an aqueous liquid;
(b) processing the mixture using shear forces in the presence of a crosslinker in an extruder;
(c) adding a hydroxylic liquid to the extruder and dispersing the mixture inside the extruder or outside the extruder or both inside and outside the extruder to obtain the dispersion.

The novel process which is a preferred embodiment of the general process described above is performed in a way that a premix of starch (e.g. starch/water mixture or starch/water/alcohol mixture) which optionally contains a plasticizer is processed in an extruder. The crosslinker is present in the premix or injected into the extruder. The extrusion is performed under the same conditions as described above for the general process, i.e. a minimum energy input of 100 J/g is needed during the processing. The hydroxylic liquid, preferably water, is injected into the starch mixture in one of the last sections of the extruder at a level to reach the final solids content. Reversed screw elements and kneading elements may be available in the last sections of the extruder in order to homogenize the dispersion. It is also possible to obtain the final dispersion outside the extruder. Preferably, the outside dispersion follows a homogenization step inside the extruder. The preferred methods to obtain the final dispersion are:

the extrudate is stirred in a dispersing vessel (batch type process); or the extrudate is forced through a tube containing some static mixing elements which homogenize the dispersion (continuous process); or the extrudate is fed to a continuous pumping device which introduces shear on the heterogeneous flow and thus causing the extrudate to homogenize.

A sieve may be placed just before the die to reduce the size of the starch lumps before they enter the outside dispersing unit.

It is also possible to use already crosslinked starch in the dispersion step. The present invention is thus also directed to a method of preparing a dispersion of starch particles in an aqueous liquid the method comprising extruding a mixture of a crosslinked cationic starch and an aqueous liquid in the presence of a hydroxylic liquid to form the dispersion.

The novel starch dispersions made by the novel process are characterized by a broad particle size distribution. According to laser light scattering data the particle size typically ranges from 200 nm to 100 μm. It is theorized that the broad particle size distribution might be one reason for the exceptionally low viscosity of the starch dispersions.

The present invention will now be illustrated by the following examples. All parts and percentages are based on weight unless otherwise indicated.

REFERENCE EXAMPLE 1

A premix of 100 parts, based on dry weight, of native waxy corn starch (Meritena 300 with a moisture content of 11.5%, available from Amylum, Koog Andezaan, The Netherlands), 21 parts of water (including the water contained in the native starch), 0.1 parts of maleic acid and 17.9 parts of glycerol was prepared at room temperature in a high shear mixer. The premix was fed into an extruder (Berstorff ZE40 self-wiping, co-rotating twin screw extruder, L/D=38) at a rate of 8.81 kg/h. The extruder has 9 zones with an adjusted temperature profile of 40–80–100–110–130–100–100–100–90° C. Screw configuration 3 was used and the screw speed was set at 200 rpm. A solution of 1.9 parts of glyoxal in 16.8 parts of water was injected into the barrel at the 5th zone (22D) at a flow rate of 1.2 kg/h with a Prominent Meta HK20-12.5 S piston dosing pump. An energy input of 3.5 kJ/g was applied on the starch melt. The extrudate left the extruder through a five-hole die (diameter of holes 3 mm). The extrudate was dried and cryogenically ground and then dispersed in water. A stable low viscous starch dispersion with 35% solids was obtained.

REFERENCE EXAMPLE 2

Reference Example 2 was prepared in the same way as Reference Example 1 with the following exceptions:

No maleic acid was used in the premix.

After drying, grinding and dispersing in water a low viscous dispersion with 30% solids was obtained.

REFERENCE EXAMPLE 3

Reference Example 3 was prepared in the same way as Reference Example 2 with the following exceptions:

An acetylated crosslinked waxy corn starch (Resistamyl 342 available from Amylum) was used instead of native waxy corn starch.

After drying, grinding and dispersing in water a low viscous dispersion with 40% solids was obtained.

EXAMPLE 4

Example 4 was prepared in the same way at Reference Example 2 with the following exceptions:

A premix of 100 parts, based on dry weight, of native waxy corn starch (Meritena 300 with a moisture content of 11.5%, available from Amylum) and 20 parts of water (including the water contained in the native starch) was fed to the extruder at a rate of 7 kg/h.

No glycerol plasticizer was used.

The temperature profile of the extruder was 30–70–90–100–100–100–100–100–90° C.

1 part of glyoxal in 24 parts of water were injected into the barrel at the $2^{nd}$ zone (7D) at a rate of 1.4 kg/h.

An energy input of 2.5 kJ/g was applied on the starch melt.

285 parts of extra water were injected into the barrel at the $7^{th}$ zone (32D) at a rate of 17 l/h.

The extrudate was collected in a vessel and stirred for 1 h resulting in a homogenous stable dispersion with a solids content of 26%.

Paper Coating Examples

The following ingredients are used in the coating formulations:

$CaCO_3$ 60: dispersion of calcium carbonate with particle size of 60% <2 μm in water (Hydrocarb 60 ME available from Pluess-Stauffer, Oftringen, Switzerland), 77% solids $CaCO_3$ 90: dispersion of calcium carbonate with particle size of 90%<2 μm in water (Hydrocarb 90 ME available from Pluess-Stauffer), 77% solids Clay: dispersion of No. 2 high brightness kaolin clay with particle size of 80% <2 μm in water (SPS available form Imerys, St. Austell, England), 66.5% solids Latex A: carboxylated styrene-butadiene latex (DL 945 available from The Dow Chemical Company, Midland. USA), 50% solids in water Latex B: carboxylated styrene-butadiene latex (DL 930 available from The Dow Chemical Company), 50% solids in water Starch RE1, Starch RE2, Starch RE3: starch dispersions prepared according to Reference Examples 1, 2, and 3, respectively (the respective solids contents given in parenthesis are adjusted by adding water)

Starch A: solution of low molecular weight thermally modified corn starch (C*Film 7311 available from Cerestar Deutschland GmbH, Krefeld, Germany) in water, 30% solids, prepared and kept at a temperature >70° C.

Starch B: solution of high molecular weight oxidized corn starch (Amisol 5591 available from Amylum) in water, 30% solids, prepared and kept at a temperature >70° C.

CMC co-binder (semi-synthetic co-binder): solution of 5% of a low molecular weight sodium salt of carboxymethyl cellulose (Finnfix® 10 available from Metsa Serla, Skoghal, Sweden) in water Whitener: fuorescent whitening agent derived form stilbene disulfonic acid (Tinopal® ABP available from Ciba-Geigy, Basel, Switzerland)

The pH value of the formulations is adjusted by adding NaOH solution (10%). The solids content of the formulations is adjusted by adding water.

The above ingredients were mixed in the amounts given in Tables 1 and 3. respectively, to obtain precoat compositions (Formulations 1 to 5) and topcoat compositions (Formulations 6 to 15), respectively.

The viscosities and the dewatering values of Formulations 1 to 15 were determined as follows:

Brookfield Viscosity

The Brookfield viscosity was measured using a Brookfield RVT viscosimeter (available from Brookfield Engineering Laboratories, Inc., Stoughton. Mass. USA) at 23° C. For measuring, 600 ml of the dispersion are poured into a 1000 ml beaker and the viscosity is measured at spindle speeds of 20 and 100 rpm.

Haake Viscosity

The Haake Viscosity was measured with a Haake Rotovisco RV20 with a Rheocontroller RC20 and the measuring head SVSP (available from Haake GmbH, Karlsruhe) at 23° C. in the shear rate range of 200 $s^{-1}$ and 4500 $s^{-1}$.

ABO Dewatering Value

The dewatering value is measured with a ABO Akademi AAGWR Dewatering Device. 10 ml of the coating composition is filled into a cylinder and pressurized for 1.5 min with a pressure of 1 bar. The aqueous filtrate passes a Nucleopore 1113 membrane of 5 μm thickness and is absorbed by a Whatman No. 17 chromatographic paper. The amount of water absorbed by the chromatographic paper is specified in g of water absorbed per $m^2$ of paper.

The dewatering value is a measure of the water retention capacity of the coating under pressure. High values are indicative for a low water retention capacity under the coating conditions and could result in runnability deficiencies.

The results are given in Tables 2 and 4.

Topcoat Formulations 6 to 15 were then coated onto a paper having a weight of 39 $g/m^2$ at a coat weight of around 13 $g/m^2$. The properties of the coated paper were evaluated according to the following test procedures:

Paper Gloss

Paper gloss is measured using a Zehntner ZLR-1050 instrument at an incident angle of 75°.

Ink Gloss

The test is carried out on a Pruefbau Test Printing unit with Lorrilleux Red Ink No. 8588. An amount of 0.8 g/ml (or 1.6 $g/m^2$ respectively) ink is applied to coated paper test strips mounted on a long rubber backed platen with a steel printing disk. The pressure of the ink application is 1,000 N and the speed is 1 m/s. The printed strips are dried for 12 h at 20° C. at 55% minimum room humidity. The gloss is then measured on a Zehntner ZLR-1050 instrument at an incident angle of 75°.

Dry Pick Resistance (IGT)

The test measures the ability of the paper surface to accept the transfer of ink without picking. The test was carried out on a A2 type printability tester, commercially available from IGT Reprotest BV. Coated paper strips (4 mm×22 mm) are printed with inked aluminum disks at a printing pressure of 36 N with the pendulum drive system and the high viscosity test oil (red) from Reprotest BV. After the printing is completed, the distance where the coating begins to show damages is marked under a stereomicroscope. The marked distance is then transferred into the IGT velocity curve and the velocities in cm/s are read on the used drive curve. High velocities mean high resistance to dry pick.

Ink Piling

Ink piling is tested on a Pruefbau printability tester. Paper strips are printed with an ink commercially available under the trade name Huber Wegschlagfarbe No. 520068. A starting amount of 500 $mm^3$ is applied to an ink distribution roll. A steel printing disk is inked to achieve an ink volume of 60 $mm^3$. A coated paper strip is mounted on a rubber-backed platten and printed with the inked steel disk at a speed of 1.5 m/s and a printing pressure of 800 N. After a 10-second delay time, the paper strip is re-printed using a vulcanised rubber printing disk also containing 60 $mm^3$ of ink and at a printing pressure of 800 N. This procedure is repeated until the surface of the coated paper strip has ruptured. The number of printing passes required to rupture the coated paper surface is a measure of the surface strength of the paper.

Ink Set Off

The ink set off is tested on a Pruefbau printability tester. Paper strips are printed with ink commercially available under the trade name Huber Wegschlagfarbe No. 520068. A starting amount of 250 $mm^3$ is applied to an ink distribution roll. A steel printing disk is inked to achieve an ink volume of 30 $mm^3$ and a coated paper strip is printed with the inked steel disk. The printing speed is 1.5 m/sec and the printing pressure is 1000 N. An off print is made towards a standard strip commercially available from Scheuffelen under the designation Kunstdruckpapier APCO II/II 150 $g/m^2$ with a steel set off disc and a pressure of 400 N. An off-print is made after 15 s, 30 s, 60 s and 120 s. The ink density of the off print is measured using a Gretag ink densitometer. It is a measure of the drying rate of the ink.

Mottling

This test is done to assess the print irregularity. Paper strips are printed on the Pruefbau Test Printing unit with a test ink commercially available under the trade designation Huber Mottling Test Farbe No. 40 8010. First a volume of 250 $mm^3$ ink is applied with a steel roll. Then three passes using a vulcanized rubber roll follow and in each of those three passes an additional volume of 30 $mm^3$ of ink is applied. For evaluation of the mottling the strip is digitally analyzed using the Mottling Viewer Software from Only Solutions GmbH. First the strip is scanned and the scan is converted to a gray scale. Then the deviation in gray scale intensity is measured at seven different resolutions with a width of 0.17 mm, 0.34 mm, 0.67 mm, 1.34 mm, 2.54 mm, 5.1 mm and 10.2 mm. From these measurements a mottle value (MV) is calculated. The result shows the print irregularity. A higher number in the result means a higher irregularity.

ISO Brightness (UV)

The ISO brightness is measured with a Zeiss Elrepho spectrophotometer. The reflected light of a wavelength of 457 nm is measured.

TABLE 1

PRECOAT FORMULATIONS AT HIGH SOLIDS

| Formulation | 1* | 2 | 3* | 4 | 5* |
|---|---|---|---|---|---|
| | parts based on dry weight | | | | |
| CaCO$_3$ 60 | 100 | 100 | 100 | 100 | 100 |
| Latex A | 8 | 4 | 4 | — | — |
| Starch RE2 (30%) | — | 8 | — | 16 | — |
| Starch A | — | — | 8 | — | 16 |
| CMC Co-binder | 1.1 | — | — | — | — |
| pH Value | 9 | 9 | 9 | 9 | 9 |
| Solids Content % | 64 | 64 | 64 | 64 | 64 |

*comparative examples

TABLE 2

PHYSICAL PROPERTIES OF FORMULATIONS 1 TO 5

| Formulation | 1* | 2 | 3* | 4 | 5* |
|---|---|---|---|---|---|
| Brookfield Viscosity in mPa · s | | | | | |
| initially | | | | | |
| at 20 rpm | 4900 | 1000 | 700 | 3200 | 15000 |
| at 100 rpm | 1600 | 720 | 360 | 2600 | 4100 |
| after 4 days | | | | | |
| at 20 rpm | 5100 | 1100 | 1200 | 6000 | 42000 |
| at 100 rpm | 1700 | 800 | 520 | 4000 | 10000 |
| Dewatering Value | | | | | |
| ABO g H$_2$O/m$^2$ | 112 | 22 | 105 | 19 | 45 |

In Formulation 2 the starch functions as a co-binder whereas in Formulation 4 the starch is the sole binder. The initial viscosity of Formulation 2 as well as the viscosity after 4 days is much lower than that of Comparison Formulation 1. The water retention capacity of Formulation 2 is also much better than that of Formulation 1. Although the viscosities of Formulation 2 and Comparison Formulation 3 are in about the same ranges the water retention capacity of Formulation 2 is superior to that of Formulation 3. In Formulation 4 and Comparison Formulation 5 the starch functions as the sole binder. It is clearly visible that the viscosities of Formulation 4 are much lower.

Only the formulations according to the invention have both acceptably low viscosities and low dewatering values, i.e. high water retention capacity.

TABLE 3

TOPCOAT FORMULATIONS AT HIGH SOLIDS

| Formulation | 6* | 7* | 8 | 9 | 10 | 11* | 12 | 13 | 14 | 15* |
|---|---|---|---|---|---|---|---|---|---|---|
| | parts based on dry weight | | | | | | | | | |
| CaCO$_3$ 90 | 70 | 70 | 70 | 70 | 70 | 70 | 70 | 70 | 70 | 70 |
| Clay | 30 | 30 | 30 | 30 | 30 | 30 | 30 | 30 | 30 | 30 |
| Latex B | 8 | | 4 | 4 | 4 | 4 | | | | |
| Latex A | | 8 | | | | | 4 | 4 | 4 | 4 |
| Starch RE3 (28.6%) | | | 8 | | | | 8 | | | |
| Starch RE2 (28.9%) | | | | 8 | | | | 8 | | |
| Starch RE1 (32.1%) | | | | | 8 | | | | 8 | |
| Starch A | | | | | | 8 | | | | |
| Starch B | | | | | | | | | | 8 |
| CMC Co-binder | 0.5 | 0.5 | — | — | — | — | — | — | — | — |
| Whitener | 1.0 | 1.0 | 1.0 | 1.0 | 1.0 | 1.0 | 1.0 | 1.0 | 1.0 | 1.0 |
| pH Value | 8.5 | 8.5 | 8.5 | 8.5 | 8.5 | 8.5 | 8.5 | 8.5 | 8.5 | 8.5 |
| Solids Content % | 65.1 | 65.0 | 65.3 | 65.2 | 65.2 | 65.1 | 65.0 | 65.0 | 65.0 | 61.5# |

*comparative examples
A solids content of more than 61.5% could not be reached in Formulation 15 as the formulation became solid at higher solids contents. Physical properties of the paper coated with rormulation 15 were not measured: due to the reduced solids content the results would not be comparable with the other formulations.

TABLE 4

PHYSICAL PROPERTIES OF FORMULATIONS 6 TO 15

| Formulation | 6* | 7* | 8 | 9 | 10 | 11* | 12 | 13 | 14 | 15* |
|---|---|---|---|---|---|---|---|---|---|---|
| Brookfield Viscosity in mPa · s | | | | | | | | | | |
| initially | | | | | | | | | | |
| at 20 rpm | 4100 | 4000 | 4300 | 3300 | 2700 | 2600 | 5000 | 4000 | 3300 | 5200 |
| at 100 rpm | 1220 | 1190 | 1480 | 1160 | 920 | 920 | 1640 | 1320 | 1080 | 1640 |
| after 1 day | | | | | | | | | | |
| at 20 rpm | 4010 | 3870 | 4070 | 3420 | 2690 | 2870 | 4450 | 3390 | 3110 | 5690 |

TABLE 4-continued

PHYSICAL PROPERTIES OF FORMULATIONS 6 TO 15

| Formulation | 6* | 7* | 8 | 9 | 10 | 11* | 12 | 13 | 14 | 15* |
|---|---|---|---|---|---|---|---|---|---|---|
| at 100 rpm after 2 days | 1182 | 1164 | 1470 | 1198 | 948 | 1060 | 1572 | 1260 | 1066 | 1908 |
| at 20 rpm | 3870 | 3520 | 4090 | 3380 | 2610 | 3140 | 4690 | 3400 | 3260 | 5320 |
| at 100 rpm | 1157 | 1120 | 1500 | 1208 | 954 | 1092 | 1598 | 1254 | 1090 | 1884 |
| Solids in % after 5 days | 65.0 | 65.0 | 65.3 | 65.2 | 65.3 | 65.2 | 65.1 | 65.2 | 65.3 | n.m. |
| at 20 rpm | 3670 | 3750 | 4190 | 3200 | 2530 | 25000 | 4750 | 3510 | 2890 | 6980 |
| at 100 rpm | 1142 | 1148 | 1598 | 1174 | 958 | 7300 | 1628 | 1244 | 1024 | 2240 |
| Solids in % | 65.0 | 65.0 | 65.3 | 65.3 | 65.3 | 65.4 | 65.1 | 65.2 | 65.3 | 61.5 |
| Haake Viscosity in mPa · s | | | | | | | | | | |
| at 1000 s$^{-1}$ | 121 | 110 | 270 | 245 | 208 | 252 | 317 | 242 | 189 | 263 |
| at 2500 s$^{-1}$ | 86 | 78 | 233 | 221 | 190 | 223 | 218 | 214 | 169 | 188 |
| at 4500 s$^{-1}$ | 75 | 69 | 221 | 210 | 186 | 208 | 254 | 202 | 163 | 159 |
| Dewatering Value | | | | | | | | | | |
| ABO g H$_2$O/m$^2$ | 142 | 136 | 56 | 60 | 74 | 91 | 49 | 55 | 73 | 42 | n.m. not measured

In accordance with the results shown in Table 2 only Formulations 8, 9, 10, 12, 13, and 14 according to the present invention have low viscosities, even after 5 days, in combination with low dewatering values. Comparison Formulation 11 (standard starch A as co-binder) shows a very strong post thickening behavior whereas it was not possible to prepare a formulation with a solids content of more than 61.5% with standard starch B (Comparison Formulation 15). That means that the formulations comprising the starch dispersions according to the present invention can be formulated at about 4% higher solids content and are still stable in viscosity over time.

corresponds to the values of the coatings comprising the CMC co-binder.

Dry pick resistance of the coatings according to the present invention is superior to that of the coating containing the standard starch (Formulation 11) and also at least as good or even better than that of the coatings with CMC co-binder (Formulations 6 and 7).

Ink piling of the present topcoats is much better than of coats prepared from Comparison Formulations 6 and 7 and at least as good as of coat prepared from Comparison Formulation 11.

The ink set off values of the coatings according to the present invention are intermediate between that of the coat-

TABLE 5

PHYSICAL PROPERTIES OF TOPCOATS
PREPARED FROM FORMULATIONS 6 TO 15

| Formulation | 6* | 7* | 8 | 9 | 10 | 11* | 12 | 13 | 14 |
|---|---|---|---|---|---|---|---|---|---|
| Paper Gloss % | 63 | 62 | 57 | 60 | 62 | 56 | 57 | 58 | 59 |
| Ink Gloss % | | | | | | | | | |
| 0.8 g/m$^2$ | 85 | 85 | 85 | 85 | 85 | 81 | 84 | 84 | 85 |
| 1.6 g/m$^2$ | 89 | 90 | 89 | 89 | 90 | 87 | 89 | 89 | 88 |
| Dry Pick cm/s | 56 | 56 | 55 | 60 | 65 | 52 | 59 | 59 | 67 |
| Ink Piling (Passes) | 3 | 3 | 8 | 6 | 6 | 5 | 5 | 6 | 6 |
| Ink Set Off Density | | | | | | | | | |
| 15 s | 0.15 | 0.13 | 0.38 | 0.36 | 0.45 | 0.55 | 0.43 | 0.35 | 0.33 |
| 30 s | 0.03 | 0.02 | 0.13 | 0.20 | 0.12 | 0.17 | 0.16 | 0.14 | 0.15 |
| 60 s | 0.00 | 0.00 | 0.05 | 0.03 | 0.04 | 0.06 | 0.06 | 0.04 | 0.04 |
| 120 s | 0.00 | 0.00 | 0.01 | 0.01 | 0.01 | 0.02 | 0.01 | 0.01 | 0.01 |
| Mottling Value | 6.4 | 5.8 | 5.9 | 6.0 | 6.3 | 5.9 | 6.3 | 5.6 | 6.0 |
| ISO Brightness (UV) % | 79.1 | 79.1 | 81.7 | 81.4 | 80.9 | 81.1 | 81.5 | 81.8 | 81.6 |

Paper gloss of the papers coated with the coating compositions according to the present invention is higher than that resulting from coating compositions comprising standard starch solution as binder (Comparison Formulation 11). Only the coatings with an "all synthetic" binder system, i.e. comprising latex in combination with a CMC co-binder (Comparison Formulations 6 and 7) being much more expensive than starch show superior paper gloss.

Ink gloss of the coatings according to the present invention is superior to that of the coating with standard starch and ings with the "all synthetic" binder system (Formulations 6 and 7) and the coating containing the standard starch (Formulation 11). The coating compositions of the present invention therefore lead to more desirable ink drying properties compared to compositions comprising "all synthetic" binders (drying to fast) or conventional starch solutions (drying to slow).

The mottling values are within the ranges achieved with the comparison formulations whereas the ISO brightness of the present topcoat is superior to the brightness of coats comprising CMC co-binders. Similar to conventional starch solutions the present starches seem to enhance the effect of optical brightening agents (whiteners).

What is claimed is:

1. A coating composition comprising
   (i) a pigment and
   (ii) a starch dispersion of discrete crosslinked native starch particles in an aqueous liquid,
   wherein the particle size of the starch particles in the starch dispersion ranges from 200 nm to 100 µm.

2. The coating composition according to claim 1 wherein the solids content of the starch dispersion is from 25 to 50% by weight.

3. The coating composition according to claim 1 wherein the starch dispersion is obtainable by a process comprising:
   (a) obtaining a mixture of starch and an aqueous liquid;
   (b) processing the mixture using shear forces in the presence of a crosslinker; and
   (c) adding and mixing in a hydroxylic liquid to obtain the starch dispersion.

4. The coating composition according to claim 1, comprising
   (i) 100 parts by weight of pigment, and
   (ii) 1 to 300 parts by weight of starch, all based on dry weight.

5. The coating composition according to claim 1 further comprising (iii) a synthetic latex.

6. The coating composition according to claim 5 comprising
   (i) 100 parts by weight of pigment,
   (ii) 1 to 300 parts by weight of starch, and
   (iii) 1 to 20 parts by weight of synthetic latex, all based on dry weight.

7. The coating according to claim 1 having a solids content of from 50 to 64% weight.

8. A method of preparing a dispersion of starch particles in an aqueous liquid comprising
   (a) obtaining a mixture starch and an aqueous liquid;
   (b) processing the mixture using shear forces in the presence of a crosslinker in an extruder; and
   (c) adding a hydroxylic liquid to the extruder and dispersing the mixture inside the extruder or outside the extruder or both inside and outside the extruder to obtain the dispersion.

9. The method according to claim 8 wherein in step (c), after injection of the hydroxylic liquid, the mixture is first predispersed inside the extruder and afterwards dispersion is completed outside the extruder.

10. The method according to claim 8 wherein the aqueous liquid in step (a) is water or a combination of water and alcohol and the hydroxylic liquid in step (c) is water and/or alcohol.

11. The method according to claim 8 wherein a plasticizer is added in step (a).

12. A method of preparing a dispersion of starch particles in an aqueous liquid the method comprising extruding a mixture of crosslinked starch and an aqueous liquid in the presence of a hydroxylic liquid to form the dispersion.

13. The method according to the claim 12 wherein the solids content of the starch dispersion is from 25 to 50% by weight.

14. A starch dispersion obtainable by the method according to claim 12.

15. The method according to claim 8 wherein the solids content of the starch dispersion is from 25 to 50% by weight.

16. A parch dispersion obtainable by the method according to claim 8.

* * * * *